US010671468B2

(12) United States Patent
McCoy

(10) Patent No.: US 10,671,468 B2
(45) Date of Patent: **\*Jun. 2, 2020**

(54) ENHANCED DUMP DATA COLLECTION FROM HARDWARE FAIL MODES

(71) Applicant: International Business Machines Corporation, Armonk, NY (US)

(72) Inventor: Doyle J. McCoy, Rochester, MN (US)

(73) Assignee: International Business Machines Corporation, Armonk, NY (US)

( \* ) Notice: Subject to any disclaimer, the term of this patent is extended or adjusted under 35 U.S.C. 154(b) by 53 days.

This patent is subject to a terminal disclaimer.

(21) Appl. No.: 16/009,289

(22) Filed: Jun. 15, 2018

(65) Prior Publication Data

US 2018/0293127 A1    Oct. 11, 2018

Related U.S. Application Data

(63) Continuation of application No. 15/187,949, filed on Jun. 21, 2016, now Pat. No. 10,013,298, which is a
(Continued)

(51) Int. Cl.
*G06F 11/00* (2006.01)
*G06F 11/07* (2006.01)
(Continued)

(52) U.S. Cl.
CPC ...... *G06F 11/0778* (2013.01); *G06F 9/45558* (2013.01); *G06F 11/079* (2013.01);
(Continued)

(58) Field of Classification Search
CPC .............. G06F 11/0712; G06F 11/079; G06F 11/3636; G06F 11/366; G06F 9/45533
See application file for complete search history.

(56) References Cited

U.S. PATENT DOCUMENTS 6,681,348 B1   1/2004  Vachon
7,574,627 B2   8/2009  Ogasawara et al.
(Continued)

FOREIGN PATENT DOCUMENTS

CN        101216797       7/2008
CN        101398768       4/2009
(Continued)

OTHER PUBLICATIONS

Amendment filed Mar. 17, 2016 in response to Office Action (dated Dec. 18, 2015) for U.S. Appl. No. 14/277,517, filed May 14, 2014; Art Unit 2113; Confirmation No. 7016.
(Continued)

*Primary Examiner* — Charles Ehne
(74) *Attorney, Agent, or Firm* — Schmeiser, Olsen & Watts; Isaac J. Gooshaw

(57) ABSTRACT

An approach is provided for collecting data for diagnosing a failure of a computer hardware device. An address translation table of a central processing unit (CPU) of the device is collected. A format of call stack frames of an operating system (OS) image of the device is retrieved. The call stack frames are retrieved and outputted to a computer file. A second address translation table of the CPU is collected. A second format of second call stack frames is retrieved. The OS image and the second OS image are of different types but have common anchor structures. The format of the call stack frames is different from the second format. Based on the second address translation table and the second format, the second call stack frames are retrieved and outputted to the computer file. A diagnosis of the failure is received based on the computer file.

10 Claims, 3 Drawing Sheets

Related U.S. Application Data continuation of application No. 14/277,517, filed on May 14, 2014, now Pat. No. 9,396,057, which is a continuation of application No. 13/226,655, filed on Sep. 7, 2011, now Pat. No. 8,762,790.

(51) Int. Cl.
 *G06F 11/36* (2006.01)
 *G06F 9/455* (2018.01)
 *G06F 12/10* (2016.01)

(52) U.S. Cl.
 CPC ........ *G06F 11/0712* (2013.01); *G06F 11/366* (2013.01); *G06F 11/3636* (2013.01); *G06F 12/10* (2013.01); *G06F 2009/45583* (2013.01); *G06F 2009/45591* (2013.01); *G06F 2212/65* (2013.01)

(56) References Cited

U.S. PATENT DOCUMENTS

| | | | |
|---|---|---|---|
| 7,685,474 | B2 | 3/2010 | Viljoen |
| 7,770,075 | B2 | 8/2010 | Kondajeri et al. |
| 7,788,537 | B1* | 8/2010 | Yellen ................. G06F 11/0727 714/38.11 |
| 7,979,749 | B2 | 7/2011 | Jann et al. |
| 8,375,386 | B2 | 2/2013 | Hendel |
| 8,762,790 | B2 | 6/2014 | McCoy |
| 9,396,057 | B2 | 7/2016 | McCoy |
| 2003/0037288 | A1* | 2/2003 | Harper .................. G06F 11/079 714/37 |
| 2005/0204199 | A1 | 9/2005 | Harper et al. |
| 2006/0168471 | A1 | 7/2006 | Schulstad |
| 2008/0295077 | A1* | 11/2008 | Sengupta ............ G06F 11/0748 717/124 |
| 2009/0193298 | A1 | 7/2009 | Mukherjee |
| 2010/0023810 | A1* | 1/2010 | Stolfo ................. G06F 11/3652 714/38.11 |
| 2010/0083049 | A1 | 4/2010 | Miki |
| 2011/0035618 | A1 | 2/2011 | Jann et al. |
| 2013/0061096 | A1 | 3/2013 | McCoy |
| 2014/0250335 | A1 | 9/2014 | McCoy |
| 2016/0299809 | A1 | 10/2016 | McCoy |

FOREIGN PATENT DOCUMENTS

| | | |
|---|---|---|
| CN | 1019977248 | 2/2011 |
| WO | 02095585 | 11/2002 |

OTHER PUBLICATIONS

Amendment filed Dec. 10, 2013 in response to Office Action (dated Aug. 16, 2013)for U.S. Appl. No. 13/226,655, filed Sep. 7, 2011; Art Unit 2113; Confirmation No. 4042.
Intellectual Property Office (UK) Combined Search and Examination Report under Section 17 and 18(3); Dec. 17, 2012; 5 pages.
Notice of Allowance (dated Feb. 14, 2014)for U.S. Appl. No. 13/226,655, filed Sep. 7, 2011; Art Unit 2113; Confirmation No. 4042.
Notice of Allowance (dated Apr. 25, 2016) for U.S. Appl. No. 14/277,517, filed May 14, 2014; Art Unit 2113; Confirmation No. 7016.
Office Action (dated Aug. 16, 2013)for U.S. Appl. No. 13/226,655, filed Sep. 7, 2011; Art Unit 2113; Confirmation No. 4042.
Office Action (dated Dec. 18, 2015) for U.S. Appl. No. 14/277,517, filed May 14, 2014; Art Unit 2113; Confirmation No. 7016.
Office Action (dated Nov. 2, 2017) for U.S. Appl. No. 15/187,949, filed Jun. 21, 2016; Art Unit 2113; Confirmation No. 9793.
Amendment filed Jan. 18, 2018 in response to Office Action (dated Nov. 2, 2017) for U.S. Appl. No. 15/187,949, filed Jun. 21, 2016; Art Unit 2113; Confirmation No. 9793.
Notice of Allowance (dated Mar. 1, 2018) for U.S. Appl. No. 15/187,949, filed Jun. 21, 2016; Art Unit 2113; Confirmation No. 9793.

\* cited by examiner

ENHANCED DUMP DATA COLLECTION FROM HARDWARE FAIL MODES

This application is a continuation application claiming priority to Ser. No. 15/187,949 filed Jun. 21, 2016 now U.S. Pat. No. 10,013,298, issued Jul. 3, 2018, which is a continuation application claiming priority to Ser. No. 14/277,517 filed May 14, 2014 now U.S. Pat. No. 9,396,057 issued Jul. 19, 2016 which is a continuation application claiming priority to Ser. No. 13/226,655 filed Sep. 7, 2011 now U.S. Pat. No. 8,762,790 issued Jun. 24, 2014, the contents of which are hereby incorporated by reference.

TECHNICAL FIELD

The present invention relates to a method and system for enhancing the ability of a data processing system to respond to an unexpected hardware failure, and more particularly to a technique for collecting data for diagnosing a hardware failure.

BACKGROUND

Many mid-scale to large-scale computer processing systems contain a type of control processor, and one or multiple virtual processors able to provide virtual computer processing systems under multiple operating systems. Hardware failure detection and termination mechanisms may be built into the processors, microcode (i.e., firmware) and operating systems. A system-wide hardware level termination (e.g., from a physical hardware failure or a logic design problem) can be caused by hardware, microcode, firmware or software-based code stream, event or task. Failure data can be collected and stored, and can be forwarded back to the provider of the processor for analysis and recovery actions.

BRIEF SUMMARY

In first embodiments, the present invention provides a method of collecting data for diagnosing a failure of a computer hardware device. The method includes a computer receiving an indication of the failure of the computer hardware device that results in a full system crash. The method further includes the computer collecting an address translation table of a central processing unit (CPU) of the computer hardware device. The method further includes the computer retrieving a format of a plurality of call stack frames of a call stack of an operating system (OS) image of the computer hardware device. The method further includes, based on the collected address translation table and the retrieved format of the plurality of call stack frames, the computer retrieving the plurality of call stack frames. The method further includes the computer outputting the retrieved plurality of call stack frames to a computer file.

In second embodiments, the present invention provides a computer system including a central processing unit (CPU), a memory coupled to the CPU, and a computer-readable, tangible storage device coupled to the CPU. The storage device contains instructions that, when carried out by the CPU via the memory, implement a method of collecting data for diagnosing a failure of a computer hardware device. The method includes the computer system receiving an indication of the failure of the computer hardware device that results in a full system crash. The method further includes the computer system collecting an address translation table of a CPU of the computer hardware device. The method further includes the computer system retrieving a format of a plurality of call stack frames of a call stack of an operating system (OS) image of the computer hardware device. The method further includes, based on the collected address translation table and the retrieved format of the plurality of call stack frames, the computer system retrieving the plurality of call stack frames. The method further includes the computer system outputting the retrieved plurality of call stack frames to a computer file.

In third embodiments, the present invention provides a computer program product including a computer-readable, tangible storage device having computer-readable program instructions stored therein, the computer-readable program instructions, when carried out by a central processing unit (CPU) of a computer system, implement a method of collecting data for diagnosing a failure of a computer hardware device. The method includes the computer system receiving an indication of the failure of the computer hardware device that results in a full system crash. The method further includes the computer system collecting an address translation table of a central processing unit (CPU) of the computer hardware device. The method further includes the computer system retrieving a format of a plurality of call stack frames of a call stack of an operating system (OS) image of the computer hardware device. The method further includes the computer system, based on the collected address translation table and the retrieved format of the plurality of call stack frames, the computer system retrieving the plurality of call stack frames. The method further includes the computer system outputting the retrieved plurality of call stack frames to a computer file.

In fourth embodiments, the present invention provides a process for supporting computing infrastructure. The process includes providing at least one support service for at least one of creating, integrating, hosting, maintaining, and deploying computer-readable code in a computer comprising a processor. The processor carries out instructions contained in the code causing the computer to perform a method of collecting data for diagnosing a failure of a computer hardware device. The method includes the computer receiving an indication of the failure of the computer hardware device that results in a full system crash. The method further includes the computer collecting an address translation table of a central processing unit (CPU) of the computer hardware device. The method further includes the computer retrieving a format of a plurality of call stack frames of a call stack of an operating system (OS) image of the computer hardware device. The method further includes, based on the collected address translation table and the retrieved format of the plurality of call stack frames, the computer retrieving the plurality of call stack frames. The method further includes the computer outputting the retrieved plurality of call stack frames to a computer file.

Embodiments of the present invention provide an auxiliary service device or auxiliary service processor to perform an enhanced data collection technique for collecting failure data related to operating system instances of a system or related to a hypervisor in order to diagnose and determine recovery actions for a system-wide crash that is perceived to be a hardware-caused failure, but is actually triggered by software. Embodiments disclosed herein collect data related to the interaction between hypervisor firmware and the kernel/operating system images in different partitions in order to preserve the operating system separation of the different partitions.

DETAILED DESCRIPTION

Overview

The present invention recognizes that failure termination and failure data collection mechanisms in existing mid-scale to large-scale computer processing systems collect only data directly related to an item that is likely to have failed, and therefore provide insufficient data for diagnosing a system-wide hardware level termination that may be triggered by a microcode/firmware or software-based code stream, event or task. The present invention also recognizes that other known data collection mechanisms also provide insufficient data for diagnosing system-wide hardware level terminations by focusing on collecting data from system processor based microcode and/or software operating system termination modes which do not lead to a hardware type of failure. The present invention also recognizes that virtualization technologies require isolation between operating systems executing on a system processor, such that no data from an operating system active memory image (a.k.a. partition) exists in a system level dump. The aforementioned isolation prevents proper diagnostics in the case of software code stream interaction with a hardware design logic failure.

Embodiments of the present invention may provide a method and system for collecting data in a computer system experiencing a system-wide hardware level termination (e.g., from a physical hardware failure or a logic design problem) that is perceived to be caused by hardware but is actually triggered by a microcode, firmware or software-based code stream, event or task. As used herein, a system-wide hardware level termination (a.k.a. hardware processor fail mode) is defined as a full system crash that indicates that a computer hardware device has failed and may be the cause of the crash. Embodiments of the present invention take advantage of the idea that operating systems and hypervisor firmware in system memory use some of the same inter-related architectures and structures concerning their stack, page translation mechanisms (e.g., common page table for virtualization) and task data storage mechanisms. Thus, in areas where an error can be described as inter-related between the hypervisor firmware and operating system microcode or kernel, an auxiliary service device (or auxiliary service processor) disclosed herein collects data points from the failing core based on the aforementioned inter-related architectures and structures and based on characteristics of each operating system image, such as endian format, word size, stack frame format, and addressing mode for each operating system image. The data points collected by the auxiliary service device include, but are not limited to, call stacks from physical or virtual processors with executing tasks regardless of the operating system image to which the tasks belong. The auxiliary service device does not require an ambulance logical partition (LPAR) to collect the aforementioned failure data.

Figure 1:
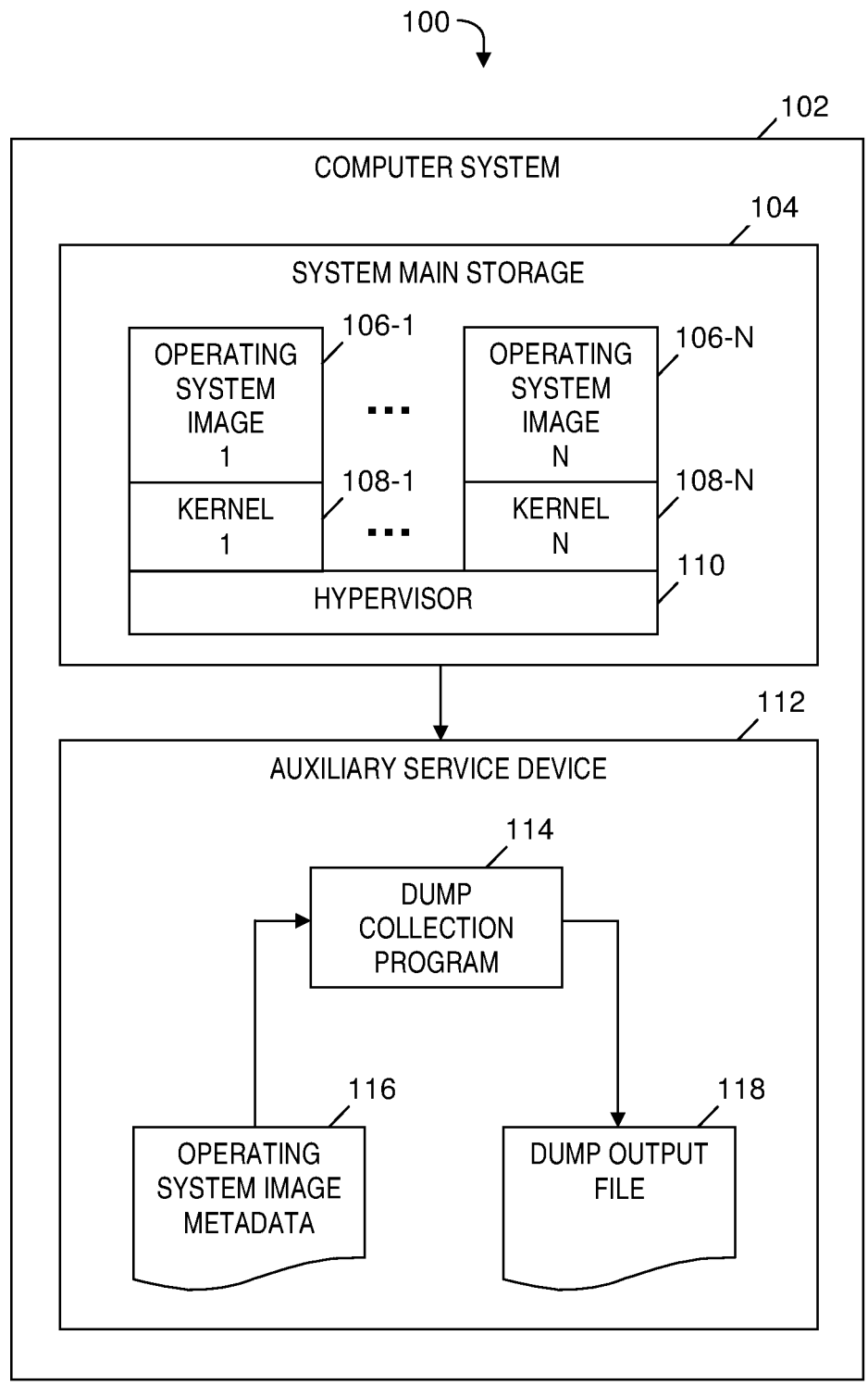
FIG. 1 is a block diagram of a system for collecting data for diagnosing a software-caused failure of a computer hardware device, in accordance with embodiments of the present invention.

System For Collecting Data for Diagnosing a Software-Caused Failure of a Computer Hardware Device FIG. 1 is a block diagram of a system for collecting data for diagnosing a software-caused failure of a computer hardware device, in accordance with embodiments of the present invention. An embodiment of system 100 includes a computer system 102, which includes a system main storage 104. System main storage 104 is a tangible computer data storage device that serves as the main storage of computer system 102. In one embodiment, system main storage 104 is volatile memory.

Computer system 102 runs operating system (OS) images 106-1 ... 106-N and kernels 108-1 ... 108-N, where N≥2. The OS images 106-1 ... 106-N are associated with kernels 108-1 ... 108-N in a one-to-one correspondence. A hypervisor 110 (i.e., partition manager) manages logical partitions (not shown) in which OS images 106-1 ... 106-N and kernels 108-1 ... 108-N run.

OS images 106-1 ... 106-N have similar image architectural structures such as root image structures. For example, root image structures such as a Processor Architected Control Area (PACA) and a Node Architected Control Area (NACA) are required to have a minimal structural consistency between OS images for hypervisor support. In embodiments of the present invention, control queues and allocations are required to be consistent between OS images 106-1 ... 106-N for communication with hardware devices.

Computer system 102 includes an auxiliary service device 112 that runs a dump collection program 114 that implements a data collection process included in embodiments of the present invention. Auxiliary service device 112 includes one or more computer data repositories that include operating system image metadata 116, dump output file 118, and system hardware information (not shown) collected from hardware devices included in computer system 102. Operating system image metadata 116 is stored on a computer data storage device and includes information for various types of OS images 106-1 ... 106-N on the platform of computer system 102. One of the types of OS images 106-1 ... 106-N can be a hypervisor program image.

OS image metadata 116 includes the data presented below for each hardware central processing unit (CPU) of computer system 102:
  endian format (i.e., big endian, little endian or mixed endian)
  word size (e.g., 32-bit or 64-bit)
  the register that indicates the stack backchain pointer (e.g., GPR1)
    the register that refers to the address of the next instruction to be carried out by the CPU
  the addressing mode (e.g., virtual, real, etc.)
    the address translation methodology and the address translation table to use for address translation
    how to determine the type of OS image to which the CPU belongs. OS image types may be an enumeration of the specific types (or types and versions) of operating systems, as well as a type that indicates a hypervisor program.

In one embodiment, auxiliary service device 112 determines the data listed above by accessing registers (not shown) of the CPU (not shown) of computer system 102 and retrieving bits within the registers.

For tasks associated with each CPU of computer system 102, OS image metadata 116 includes the layout of the task structure within storage. It is not necessary for OS image metadata 116 to repeat the information provided by the CPU registers (see the data listed above), except in how to format where the registers are stored in task memory.

Dump collection program 114 retrieves the data listed above from OS image metadata 116 and retrieves data from system main storage 104 in order to retrieve data points including call stack frames (not shown). OS image metadata 116 describes the following information, which is used to by auxiliary service device 112 to retrieve information about a call stack frame:

- Where the next stack frame pointer or pointers (for a doubly chained stack) are stored
- Where the instruction return address is located. For most hardware architectures, the instruction return address is described as the address of the instruction to be carried out next upon a return from a called program.
- The execution type of the call stack frame (e.g., 32-bit or 64-bit; single-level storage or private virtual addressing; little endian, big endian or mixed endian word architectures). The execution type of the frame accounts for operating systems that can run multiple environments simultaneously within the same OS image.
- The type of the call stack frame (e.g., exception or non-exception, hidden or open, etc.)

Dump collection program 114 outputs the retrieved data points including the call stack frames as a dump image in dump output file 118. Dump output file 118 is stored on a computer data storage device (not shown) included in auxiliary service device 112. The dump image indicates the state of operating systems in computer system 102 at the time of a full system crash of computer system 102. Dump output file 118 may be analyzed to diagnose a software-related cause of the full system crash of computer system 102 and to determine action(s) to recover from the full system crash.

In another embodiment, OS image metadata 116 and/or dump output file 118 are stored in one or more computer data repositories external to auxiliary service device 112 and external to computer system 102, and coupled to auxiliary service device 112.

In another embodiment, auxiliary service device 112 is external to computer system 102 and is coupled to computer system 102 (e.g., by a cabled attachment).

The functionality of the components of system 100 is further described below relative to FIG. 2 and FIG. 3.

Figure 2:
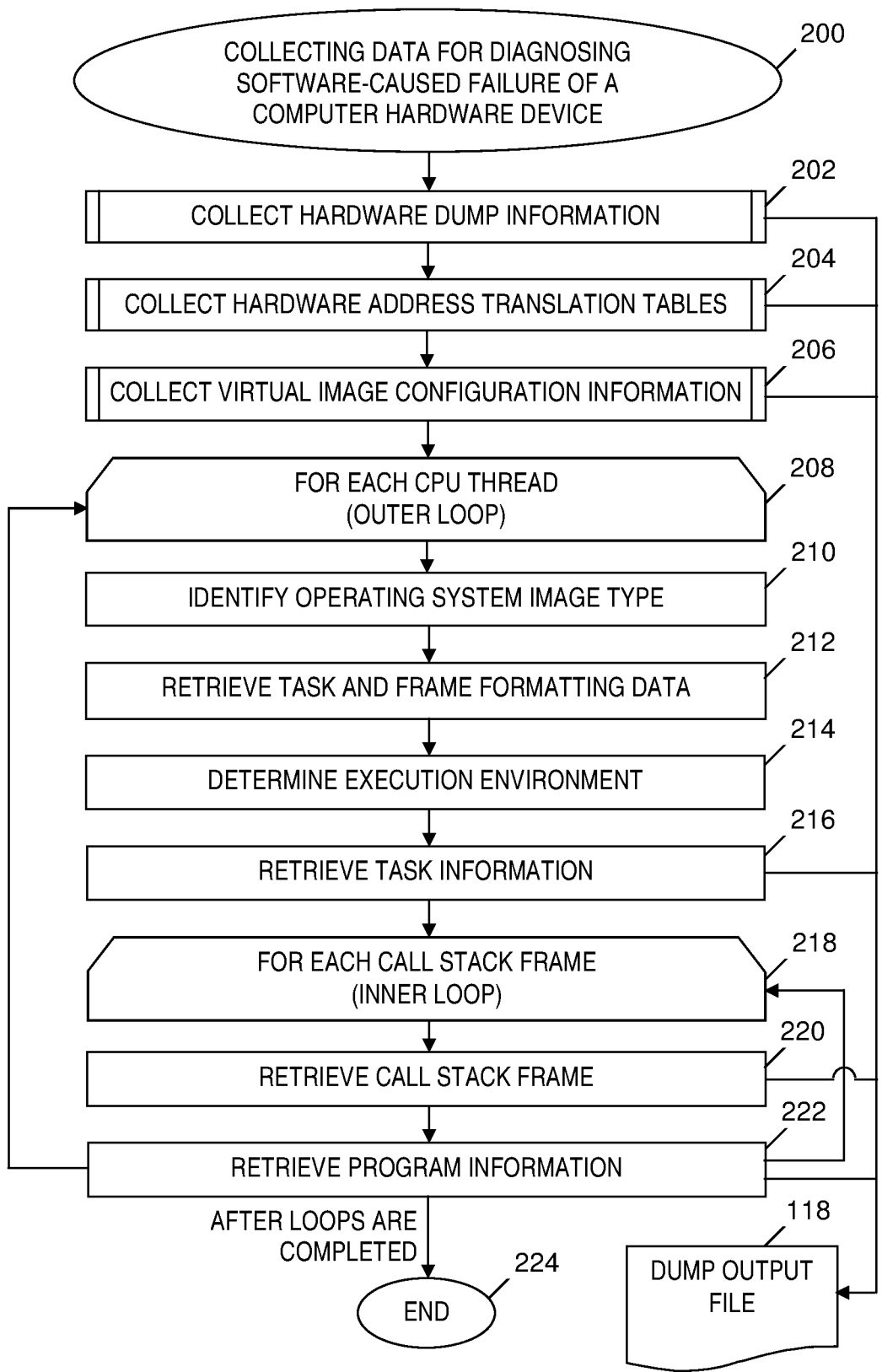
FIG. 2 is a flowchart of a process of collecting data for diagnosing a software-caused failure of a computer hardware device, where the process is implemented in the system of FIG. 1, in accordance with embodiments of the present invention.

Process for Collecting Data for Diagnosing a Software-Caused Failure of a Computer Hardware Device FIG. 2 is a flowchart of a process of collecting data for diagnosing a software-caused failure of a computer hardware device, where the process is implemented in the system of FIG. 1, in accordance with embodiments of the present invention. The process of collecting data for diagnosing a software-caused failure of a computer hardware device begins at step 200. Prior to step 202, computer system 102 (see FIG. 1) experiences a full system crash (i.e., the hardware platform crashes) and the termination mode indicates a computer hardware failure. The full system crash may be the result of, for example, a hardware-detected processor, pipeline, cache, or memory fault. While the termination mode indicates a hardware failure, data relating to the OS is required to properly understand and diagnose the hardware-reported failure.

Subsequent to the full system crash and prior to step 202, auxiliary service device 112 (see FIG. 1) or another device or processor (not shown in FIG. 1) included in or coupled to computer system 102 (see FIG. 1) detects or receives an indication of a hardware failure mode for computer system 102 (see FIG. 1).

In step 202, auxiliary service device 112 (see FIG. 1) or the other device or processor collects hardware dump information for an apparent hardware-related condition. The hardware dump information may be collected from one or more hardware devices, such as system processor(s), cache devices, pipelines, input/output (I/O) devices and circuits using an option that preserves system main storage 104 (see FIG. 1). For example, generating hardware dump information with the option to preserve system main storage is available in PowerPC® pSeries/iSeries® systems offered by International Business Machines Corporation located in Armonk, N.Y.

In one embodiment, before proceeding to step 204, auxiliary service device 112 (see FIG. 1) or the other device or processor writes the hardware dump information to dump output file 118. In one embodiment, a known process is employed in step 202 to collect the hardware dump information.

In step 204, auxiliary service device 112 (see FIG. 1) or another device or processor (not shown in FIG. 1) included in or coupled to computer system 102 (see FIG. 1) collects hardware address translation tables. Hardware address translation tables include the data used by a CPU of computer system 102 (see FIG. 1) to translate virtual addresses and I/O addresses to actual memory addresses or I/O addresses. Unlike current data collection techniques in which hardware address translation tables are collected when the termination mode is a software failure, but are not collected when the termination mode is a hardware failure, embodiments of the present invention collect the hardware address translation tables because software may be a reason for the hardware failure. In one embodiment, before proceeding to step 206, auxiliary service device 112 (see FIG. 1) or the other device or processor writes the hardware address translation tables to dump output file 118.

In step 206, auxiliary service device 112 (see FIG. 1) or another device or processor (not shown in FIG. 1) included in or coupled to computer system 102 (see FIG. 1) collects virtual image configuration information for OS images 106-1 . . . 106-N (see FIG. 1) active in computer system 102 (see FIG. 1). The virtual image configuration information is collected from system main storage 104 (see FIG. 1) by using data from OS image metadata 116 (see FIG. 1). The virtual image configuration information collected in step 206 includes data that indicates the allocations of CPU threads to OS images 106-1 . . . 106-N (see FIG. 1) at the time of the failure. In one embodiment, before proceeding to step 208, auxiliary service device 112 (see FIG. 1) or the other device or processor writes the collected virtual image configuration information to dump output file 118.

Unlike current data collection techniques in which virtual image configuration information is collected when the termination mode is a software failure, but is not collected when the termination mode is a hardware failure, an embodiment of the present invention collects the virtual image configuration information in step 206 even though the termination mode indicates a hardware failure.

Step 208 starts an outer loop for each CPU thread allocated to OS images 106-1 . . . 106-N (see FIG. 1) in computer system 102 (see FIG. 1). The CPU thread being considered in an iteration of the outer loop is also referred to herein as the current CPU thread.

In step 210, auxiliary service device 112 (see FIG. 1) compares an identification of the current CPU thread (i.e., CPU thread number) with the virtual image configuration information collected in step 206, thereby determining the OS image of OS images 106-1 . . . 106-N (see FIG. 1) to which the current CPU thread is allocated. Step 210 also includes auxiliary service device 112 (see FIG. 1) identifying the type (a.k.a. OS image type) of the OS image to which the current CPU thread is allocated.

In step 212, auxiliary service device 112 (see FIG. 1) retrieves task and frame formatting data (i.e., formatting data for tasks and formatting data for call stack frames) from OS image metadata 116 (see FIG. 1). The task and frame formatting data retrieved in step 212 is associated with the OS image type identified in step 210.

In step 214, auxiliary service device 112 (see FIG. 1) determines an instruction execution environment of the current CPU thread. By retrieving data from OS image metadata 116 (see FIG. 1), auxiliary service device 112 (see FIG. 1) determines the word size (e.g., 32-bit or 64-bit) being used by the OS image determined in step 210, whether the OS image uses little endian, big endian, or a mixed endian format, whether the OS image is in hypervisor mode, the state of the CPU allocated to the OS image, and which registers are to be used to determine the address of the first call stack frame entry.

In step 216, auxiliary service device 112 (see FIG. 1) retrieves task information (i.e., information about the task being run by the current CPU thread at the time of the full system crash). Step 216 includes the auxiliary service device 112 (see FIG. 1) retrieving the location of the task storage in system main storage 104 (see FIG. 1) by using the task formatting data retrieved in step 212. In one embodiment, before proceeding to step 218, auxiliary service device 112 (see FIG. 1) copies pages from the task storage that include the task information (i.e., the retrieved task information), and writes the pages that include the retrieved task information to dump output file 118.

Step 218 starts an inner loop for each call stack frame in the call stack of the OS image to which the current CPU thread is allocated. The call stack frame being considered in an iteration of the inner loop is also referred to herein as the current call stack frame.

In step 220, auxiliary service device 112 (see FIG. 1) retrieves the call stack frame by using the frame formatting data retrieved in step 212. In one embodiment, before proceeding to step 222, auxiliary service device 112 (see FIG. 1) copies the pages from system main storage 104 (see FIG. 1) that include the call stack frame (i.e., the retrieved call stack frame) and writes the pages that include the retrieved call stack frame to dump output file 118.

In step 222, auxiliary service device 112 (see FIG. 1) identifies a program execution address for the current call stack frame, retrieves program information for the current call stack frame by using the identified program execution address, and determines the type of the program information. Step 222 may retrieve program information in various formats, such as eXtended Common Object File Format (XCOFF). In one embodiment, before looping back to step 218 (if an address of a next call stack frame to be considered in the inner loop is identified), transferring control back to step 208 (if there is no next call stack frame for the current CPU thread, and there is a next CPU thread to be considered in the outer loop) or otherwise proceeding to step 224, auxiliary service device 112 (see FIG. 1) copies pages that include the program information (i.e., the retrieved program information) from system main storage 104 (see FIG. 1) and writes the pages that include the retrieved program information to dump output file 118.

When the inner loop reaches the end of the call stack where no more call stack frames exist to be formatted, control is transferred back to step 208 and if there is a next CPU thread, the next CPU thread is considered in a next iteration of the outer loop starting at step 208. If both the inner and outer loops are finished processing all the call stack frames and CPU threads, respectively, then the process of FIG. 2 ends at step 224.

Each time information is retrieved from system main storage 104 (see FIG. 1) in steps 204, 206, 208, 210, 212, 214, 216, 220 and 222, dump collection program 114 (see FIG. 1) performs address translation. Had there not been a full system crash, the address translation could be performed by the hardware of computer system 102 (see FIG. 1) during runtime. Because the hardware is terminated by the full system crash prior to step 202, the hardware cannot be used for address translation. Thus, the dump collection program 114 (see FIG. 1) looks up and retrieves metadata from OS image metadata 116 (see FIG. 1), where the metadata is stored in association with a particular CPU task of the current CPU thread. The retrieved metadata for the particular CPU task includes the type of the call stack frame and the address translation mode (e.g., single level or private addressing; real or virtual; shared, etc.). Subsequently, dump collection program 114 (see FIG. 1) identifies the address translation methodology of the CPU. Based on the identified address translation methodology, dump collection program 114 (see FIG. 1) performs address translation at steps 204, 206, 208, 210, 212, 214, 216, 220 and 222 in order to fetch information from system main storage 104 (see FIG. 1).

The process of FIG. 2 may include dumping image control structures to dump output file 118. To dump image control structures, the auxiliary service device 112 (see FIG. 1) captures the address translation, address translation data, and required locations of the image control structure data. In an alternate embodiment, the auxiliary service device 112 (see FIG. 1) may capture the data for dumping image control structures at a frame or page level to allow backend tooling to analyze the data later.

In embodiments of the present invention, each time a page is written to dump output file 118 in steps 216, 220 and 222, there is a chance that a duplicate page could be written to the dump output file. In an alternate embodiment, auxiliary service device 112 (see FIG. 1) prevents the chance for duplicate pages by employing a page cache that keeps track of the pages of system main storage 104 (see FIG. 1) that are to be output to the dump image in dump output file 118. Instead of having separate outputs to dump output file 118 in steps 216, 220 and 222, the alternate embodiment includes the page cache outputting each page required by steps 216, 220 and 222 exactly one time at the conclusion of the dump processing at step 224.

After step 224, dump output file 118 includes the pages and other data written in steps 202, 204, 206, 216 220 and 222, which comprise a dump image. Based on the dump image in dump output file 118, a human analyst or a computer determines a state of the operating systems in computer system 102, diagnoses the hardware failure and determines the hardware failure was caused by software, optionally determines one or more actions to recover computer system 102, and optionally implements the one or more actions to recover the computer system.

Computer System

Figure 3:
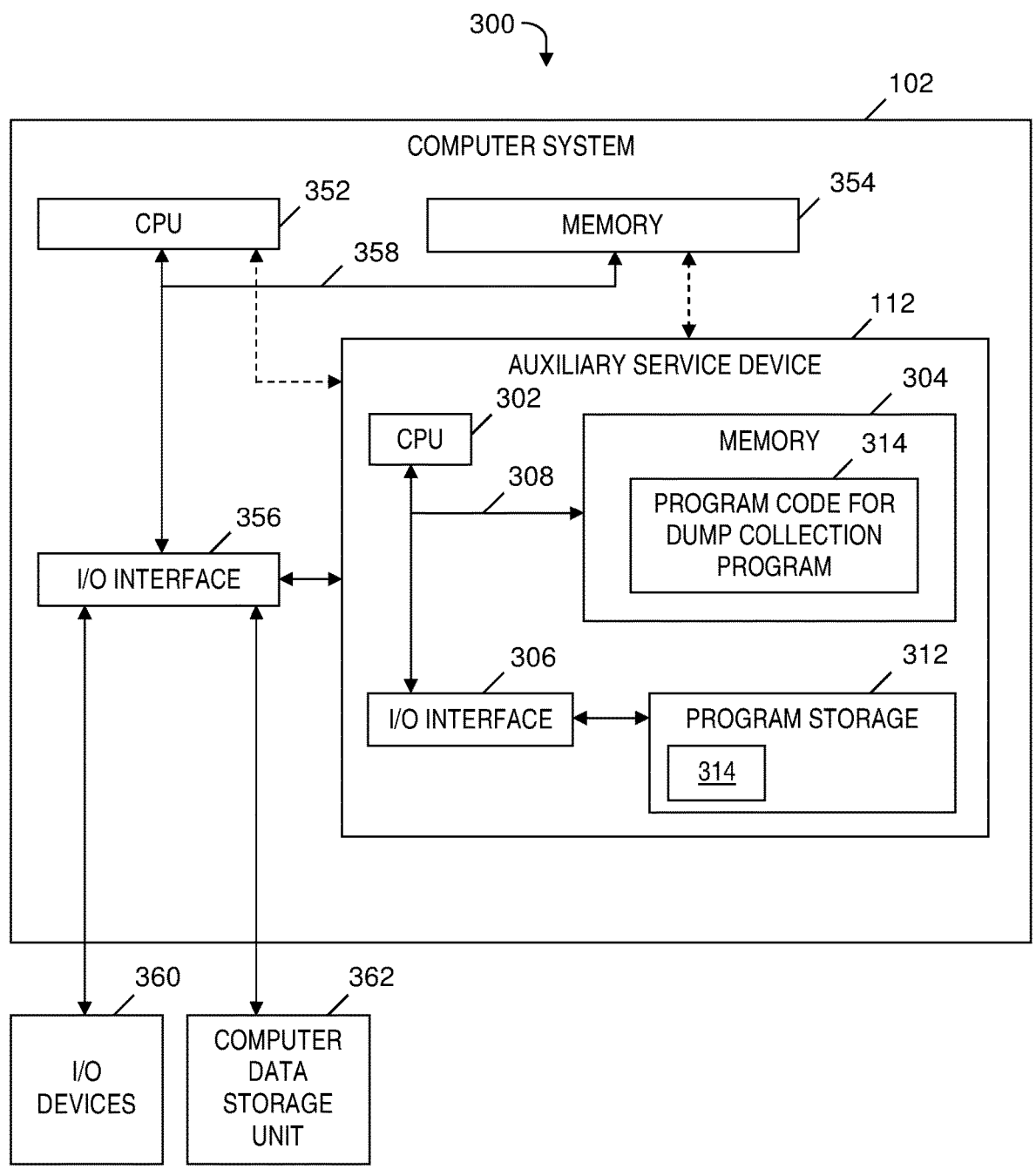
FIG. 3 is a block diagram of a computer system that is included in the system of FIG. 1 and that implements the process of FIG. 2, in accordance with embodiments of the present invention.

FIG. 3 is a block diagram of a computer system that is included in the system of FIG. 1 and that implements the process of FIG. 2, in accordance with embodiments of the present invention. System 300 is an embodiment of system 100 (see FIG. 1) and includes computer system 102, which includes auxiliary service device 112 as an embedded system. Auxiliary service device 112 is a computer system itself and generally comprises a central processing unit (CPU) 302, a memory 304, an input/output (I/O) interface 306, a bus 308 and a computer data storage unit 312 for program storage. In an alternate embodiment, auxiliary service device 112 and its components are a computer system external to and coupled to computer system 102. CPU 302 performs computation and control functions of auxiliary service device 112, including carrying out instructions included in program code 314 to perform a method of collecting data for diagnosing a failure of a computer hardware device, where the instructions are carried out by CPU 302 via memory 304. CPU 302 may comprise a single processing unit, or be distributed across one or more processing units in one or more locations (e.g., on a client and server). In one embodiment, program code 314 includes code dump collection program 114 (see FIG. 1).

Memory 304 may comprise any known computer-readable storage medium, which is described below. In one embodiment, cache memory elements of memory 304 provide temporary storage of at least some program code (e.g., program code 314) in order to reduce the number of times code must be retrieved from bulk storage while instructions of the program code are carried out. Moreover, similar to CPU 302, memory 304 may reside at a single physical location, comprising one or more types of data storage, or be distributed across a plurality of physical systems in various forms. Further, memory 304 can include data distributed across, for example, a local area network (LAN) or a wide area network (WAN).

I/O interface 306 comprises any system for exchanging information to or from a source external to auxiliary service device 112. One or more I/O devices (not shown) may be coupled to auxiliary service device 112 and may comprise any known type of external device, including a display device (e.g., monitor), keyboard, mouse, printer, speakers, handheld device, facsimile, etc. Bus 308 provides a communication link between each of the components in auxiliary service device 112, and may comprise any type of transmission link, including electrical, optical, wireless, etc.

I/O interface 306 also allows auxiliary service device 112 to store information (e.g., data or program instructions such as program code 314) on and retrieve the information from computer data storage unit 312 or another computer data storage unit (not shown). Computer data storage unit 312 may comprise any known computer-readable storage medium, which is described below. For example, computer data storage unit 312 may be a non-volatile data storage device, such as a magnetic disk drive (i.e., hard disk drive) or an optical disc drive (e.g., a CD-ROM drive which receives a CD-ROM disk).

Memory 304 and/or storage unit 312 may store computer program code 314 that includes instructions that are carried out by CPU 302 via memory 304 to collect data for diagnosing a failure of a computer hardware device. Although FIG. 3 depicts memory 304 as including program code 314, the present invention contemplates embodiments in which memory 304 does not include all of code 314 simultaneously, but instead at one time includes only a portion of code 314.

Further, memory 304 may include other systems not shown in FIG. 3, such as an operating system (e.g., Linux) that runs on CPU 302 and provides control of various components within and/or connected to auxiliary service device 112.

Storage unit 312 and/or one or more other computer data storage units (not shown) that are coupled to auxiliary service device 112 may store OS image metadata 116 (see FIG. 1), dump output file 118 (see FIG. 1) and system hardware information collected from hardware devices of computer system 102.

Computer system 102 generally comprises a CPU 352, a memory 354, an input/output (I/O) interface 356, a bus 358, and is coupled to one or more I/O devices 360 and to a computer data storage unit 362. CPU 352 performs computation and control functions of computer system 102. CPU 352 may comprise a single processing unit, or be distributed across one or more processing units in one or more locations (e.g., on a client and server).

Memory 354 may comprise any known computer-readable storage medium. Memory 354 may reside at a single physical location, comprising one or more types of data storage, or be distributed across a plurality of physical systems in various forms. Further, memory 354 can include data distributed across, for example, a LAN or a WAN.

I/O interface 356 comprises any system for exchanging information between an external source and computer system 102, including information between auxiliary service device 112 and one or more components of computer system 102. As depicted by the double arrow having a dashed line in FIG. 3 between CPU 352 and auxiliary service device 112, information used by the process disclosed herein to retrieve the dump data is exchanged between CPU 352 and auxiliary service device 112 via I/O interface 356, without requiring a direct connection between auxiliary service device 112 and CPU 352, and thereby distinguishing embodiments of the present invention from an ambulance device. As depicted by the double arrow having a dashed line in FIG. 3 between memory 354 and auxiliary service device 112, information used by the process disclosed herein to retrieve the dump data is exchanged between memory 354 and auxiliary service device 112 via I/O interface 356, without requiring a direct connection between auxiliary service device 112 and memory 354, and thereby further distinguishing embodiments of the present invention from an ambulance device.

One or more I/O devices 360 may be coupled to computer system 102 and may comprise any known type of external device, including a display device (e.g., monitor), keyboard, mouse, printer, speakers, handheld device, facsimile, etc. Bus 358 provides a communication link between each of the components in computer system 102, and may comprise any type of transmission link, including electrical, optical, wireless, etc.

I/O interface 356 also allows computer system 102 to store information (e.g., data or program instructions) on and retrieve the information from computer data storage unit 362 or another computer data storage unit (not shown). Computer data storage unit 362 may comprise any known computer-readable storage medium.

In one embodiment, memory 354 is, or includes, system main storage 104 (see FIG. 1). Further, memory 354 may include other systems not shown in FIG. 3, such as an operating system (e.g., Linux) that runs on CPU 352 and provides control of various components within and/or connected to computer system 102.

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable mediums (e.g., memory 304 and/or computer data storage unit 312) having computer-readable program code (e.g., program code 314) embodied or stored thereon.

Any combination of one or more computer-readable mediums (e.g., memory 304 and computer data storage unit 312) may be utilized. The computer readable medium may be a computer-readable signal medium or a computer-readable storage medium. In one embodiment, the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 314) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 314) embodied on a computer-readable medium may be transmitted using any appropriate medium, including but not limited to wireless, wireline, optical fiber cable, RF, etc., or any suitable combination of the foregoing.

Computer program code (e.g., program code 314) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, auxiliary service device 112 or another computer system (not shown) having components analogous to the components of auxiliary service device 112 included in FIG. 3. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2) and/or block diagrams of methods, apparatus (systems) (e.g., FIG. 1 and FIG. 3), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 314). These computer program instructions may be provided to one or more hardware processors (e.g., CPU 302) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 304 or computer data storage unit 312) that can direct a computer (e.g., computer system 102), other programmable data processing apparatus, or other devices to function in a particular manner, such that the instructions (e.g., program 314) stored in the computer-readable medium produce an article of manufacture including instructions which implement the function/act specified in the flowchart and/or block diagram block or blocks.

The computer program instructions may also be loaded onto a computer (e.g., auxiliary service device 112), other programmable data processing apparatus, or other devices to cause a series of operational steps to be performed on the computer, other programmable apparatus, or other devices to produce a computer implemented process such that the instructions (e.g., program 314) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to collecting data for diagnosing a failure of a computer hardware device. Thus, an embodiment of the present invention discloses a process for supporting computer infrastructure, wherein the process comprises providing at least one support service for at least one of integrating, hosting, maintaining and deploying computer-readable code (e.g., program code 314) in a computer system (e.g., auxiliary service device 112) comprising one or more processors (e.g., CPU 302), wherein the processor(s) carry out instructions contained in the code causing the computer system to collect data for diagnosing a failure of a computer hardware device.

In another embodiment, the invention provides a method that performs the process steps of the invention on a subscription, advertising and/or fee basis. That is, a service provider, such as a Solution Integrator, can offer to create, maintain, support, etc. a process of collecting data for diagnosing a failure of a computer hardware device. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIG. 2 and the block diagrams in FIG. 1 and FIG. 3 illustrate the architecture, functionality, and operation of possible implementations of systems, methods, and computer program products according to various embodiments of the present invention. In this regard, each block in the flowchart or block diagrams may represent a module, segment, or portion of code (e.g., program code 314), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of collecting data for diagnosing a failure of a computer hardware device, the method comprising the steps of:
    a computer receiving an indication of the failure of the computer hardware device that results in a full system crash;
    the computer collecting an address translation table of a central processing unit (CPU) of the computer hardware device;
    based on the identified type of the OS image, the computer retrieving a format of a plurality of call stack frames of a call stack of the OS image of the computer hardware device;
    based on the collected address translation table and the retrieved format of the plurality of call stack frames, a processor of the computer retrieving the plurality of call stack frames;
    the computer outputting the retrieved plurality of call stack frames to a computer file;
    the computer collecting a second address translation table of the CPU of the computer hardware device;
    the computer retrieving a second format of a second plurality of call stack frames of a second call stack of a second OS image of the computer hardware device, wherein the OS image and the second OS image are of different types but have common anchor structures including a common image core communication area and a common processor communication array, and wherein the format of the plurality of call stack frames of the call stack of the OS image is different from the second format;
    based on the collected second address translation table and the retrieved second format of the second plurality of call stack frames, the computer retrieving the second plurality of call stack frames;
    the computer outputting the retrieved second plurality of call stack frames to the computer file; and
    the computer receiving a diagnosis of the failure based on the computer file that includes the plurality of call stack frames of the call stack of the OS image and the second plurality of call stack frames of the second call stack of the second OS image.

2. The method of claim 1, further comprising the step of the computer retrieving metadata of the OS image of the computer hardware device, wherein the metadata specifies a word size of the OS image, an endian format of the OS image, an indication of whether a CPU thread to which the OS image is allocated is in hypervisor mode, an address of a top entry of the call stack, and a methodology of performing address translation in the OS image, and wherein the step of retrieving the plurality of call stack frames is further based on the word size, the endian format, the indication of whether the CPU thread is in hypervisor mode, the address of the top entry of the call stack and the methodology of performing address translation.

3. The method of claim 2, wherein the step of retrieving the plurality of call stack frames includes translating the address of the top entry of the call stack based on the methodology of performing address translation specified by the retrieved metadata and the collected address translation table.

4. The method of claim 1, further comprising the step of:
    providing at least one support service for at least one of creating, integrating, hosting, maintaining, and deploying computer readable program code in the computer, the program code being executed by a processor of the computer to implement the steps of receiving the indication of the failure of the computer hardware device that results in the full system crash, collecting the address translation table, retrieving the format of the plurality of call stack frames of the call stack of the OS image of the computer hardware device, retrieving the plurality of call stack frames, outputting the retrieved plurality of call stack frames to the computer file, collecting the second address translation table, retrieving the second format of the second plurality of call stack frames of the second call stack of the second OS image of the computer hardware device, retrieving the second plurality of call stack frames, outputting the retrieved second plurality of call stack frames to the computer file, and receiving the diagnosis of the failure based on the computer file.

5. A computer system comprising: a central processing unit (CPU); a memory coupled to the CPU of the computer system; a computer-readable, tangible storage device coupled to the CPU of the computer system, the storage device containing instructions that, when carried out by the CPU of the computer system via the memory, implement a method of collecting data for diagnosing a failure of a computer hardware device, the method comprising the steps of:
    the computer system receiving an indication of the failure of the computer hardware device that results in a full system crash;
    the computer system collecting an address translation table of a central processing unit (CPU) of the computer hardware device;
    based on the identified type of the OS image, the computer system retrieving a format of a plurality of call stack frames of a call stack of the OS image of the computer hardware device;

based on the collected address translation table and the retrieved format of the plurality of call stack frames, a processor of the computer system retrieving the plurality of call stack frames;

the computer system outputting the retrieved plurality of call stack frames to a computer file;

the computer system collecting a second address translation table of the CPU of the computer hardware device;

the computer system retrieving a second format of a second plurality of call stack frames of a second call stack of a second OS image of the computer hardware device, wherein the OS image and the second OS image are of different types but have common anchor structures including a common image core communication area and a common processor communication array, and wherein the format of the plurality of call stack frames of the call stack of the OS image is different from the second format;

based on the collected second address translation table and the retrieved second format of the second plurality of call stack frames, the computer system retrieving the second plurality of call stack frames;

the computer system outputting the retrieved second plurality of call stack frames to the computer file; and the computer system receiving a diagnosis of the failure based on the computer file that includes the plurality of call stack frames of the call stack of the OS image and the second plurality of call stack frames of the second call stack of the second OS image.

6. The computer system of claim 5, wherein the method further comprises the step of the computer system retrieving metadata of the OS image of the computer hardware device, wherein the metadata specifies a word size of the OS image, an endian format of the OS image, an indication of whether a CPU thread to which the OS image is allocated is in hypervisor mode, an address of a top entry of the call stack, and a methodology of performing address translation in the OS image, and wherein the step of retrieving the plurality of call stack frames is further based on the word size, the endian format, the indication of whether the CPU thread is in hypervisor mode, the address of the top entry of the call stack and the methodology of performing address translation.

7. The computer system of claim 6, wherein the step of retrieving the plurality of call stack frames includes translating the address of the top entry of the call stack based on the methodology of performing address translation specified by the retrieved metadata and the collected address translation table.

8. A computer program product comprising a computer-readable, tangible storage device having computer-readable program instructions stored therein, the computer-readable program instructions, when carried out by a central processing unit (CPU) of a computer system, implement a method of collecting data for diagnosing a failure of a computer hardware device, the method comprising the steps of:

the computer system receiving an indication of the failure of the computer hardware device that results in a full system crash;

the computer system collecting an address translation table of a central processing unit (CPU) of the computer hardware device;

based on the identified type of the OS image, the computer system retrieving a format of a plurality of call stack frames of a call stack of the OS image of the computer hardware device;

based on the collected address translation table and the retrieved format of the plurality of call stack frames, a processor of the computer system retrieving the plurality of call stack frames;

the computer system outputting the retrieved plurality of call stack frames to a computer file;

the computer system collecting a second address translation table of the CPU of the computer hardware device;

the computer system retrieving a second format of a second plurality of call stack frames of a second call stack of a second OS image of the computer hardware device, wherein the OS image and the second OS image are of different types but have common anchor structures including a common image core communication area and a common processor communication array, and wherein the format of the plurality of call stack frames of the call stack of the OS image is different from the second format;

based on the collected second address translation table and the retrieved second format of the second plurality of call stack frames, the computer system retrieving the second plurality of call stack frames;

the computer system outputting the retrieved second plurality of call stack frames to the computer file; and the computer system receiving a diagnosis of the failure based on the computer file that includes the plurality of call stack frames of the call stack of the OS image and the second plurality of call stack frames of the second call stack of the second OS image.

9. The computer program product of claim 8, wherein the method further comprises the step of the computer system retrieving metadata of the OS image of the computer hardware device, wherein the metadata specifies a word size of the OS image, an endian format of the OS image, an indication of whether a CPU thread to which the OS image is allocated is in hypervisor mode, an address of a top entry of the call stack, and a methodology of performing address translation in the OS image, and wherein the step of retrieving the plurality of call stack frames is further based on the word size, the endian format, the indication of whether the CPU thread is in hypervisor mode, the address of the top entry of the call stack and the methodology of performing address translation.

10. The computer program product of claim 9, wherein the step of retrieving the plurality of call stack frames includes translating the address of the top entry of the call stack based on the methodology of performing address translation specified by the retrieved metadata and the collected address translation table.

\* \* \* \* \*